Inventor
Louis Eugene Widolt Montrose-Oster
By
Blair, Curtis & Hayward
Attorneys

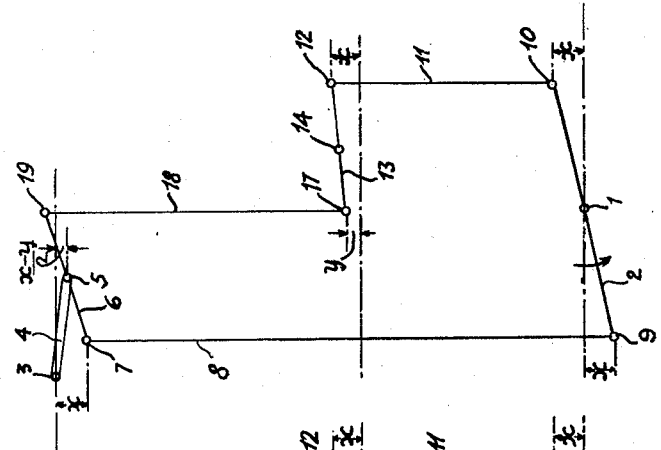
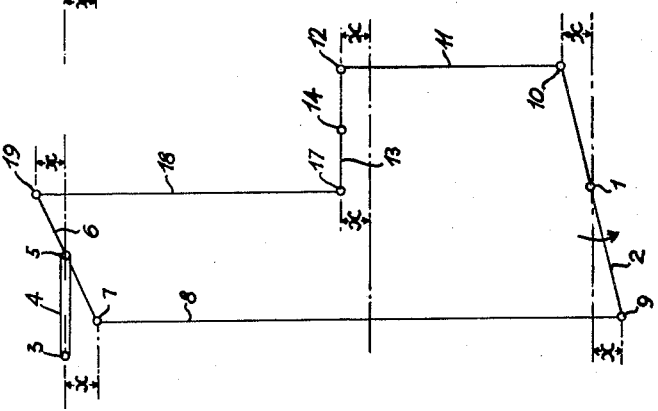
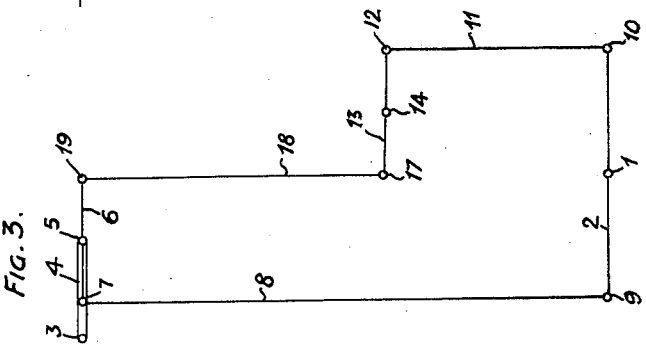

Patented Nov. 21, 1950

2,530,717

UNITED STATES PATENT OFFICE 2,530,717

DEVICE FOR DIRECTLY DETECTING, MEASURING, AND UTILIZING FOR THE PURPOSE OF CONTROL, VARIATIONS IN SPEED

Louis Eugène Widolt Montrose-Oster, Brussels-Boitsfort, Belgium, assignor to Pollopas Patents Limited, London, England, a British company Application July 15, 1948, Serial No. 38,865
In France May 25, 1945

3 Claims. (Cl. 264—1)

Several proposals have been made for utilising acceleration for control purposes. All of them involve, more or less, the correction of a regulator controlled by a centrifugal governor acting on certain masses revolving at a more or less constant speed. By adding an accelerometer device, it is possible to suppress "hunting" due to the instability resulting from the inertia of these masses. Fundamentally, such an accelerometer includes a spring and a dashpot in appropriate opposition and a lever with a virtual fulcrum movable in space, for correcting the movement of a control rod arrangement controlled by the centrifugal governor.

Although accelerometer devices operating on this principle give quite satisfactory results so long as accelerations and decelerations are involved corresponding to changes in condition of a governor revolving at high speed, it will be obvious that they cannot be equally effective when the normal speed is zero and when it is a question of detecting accelerations and decelerations corresponding to oscillatory angular velocities which may be positive or negative, i. e., in either direction of rotation, and which are very low.

The present invention describes a device which solves the problem set out above and which is strong enough to influence a regulating device directly, i. e., without the interposition of any amplifying means.

Fig. 3 is a diagram of the device in the neutral position;

Fig. 4 is a diagram of the device acting under the influence of a uniform motion;

Fig. 5 is a diagram of the device acting under the influence of an acceleration.

Figure 1:
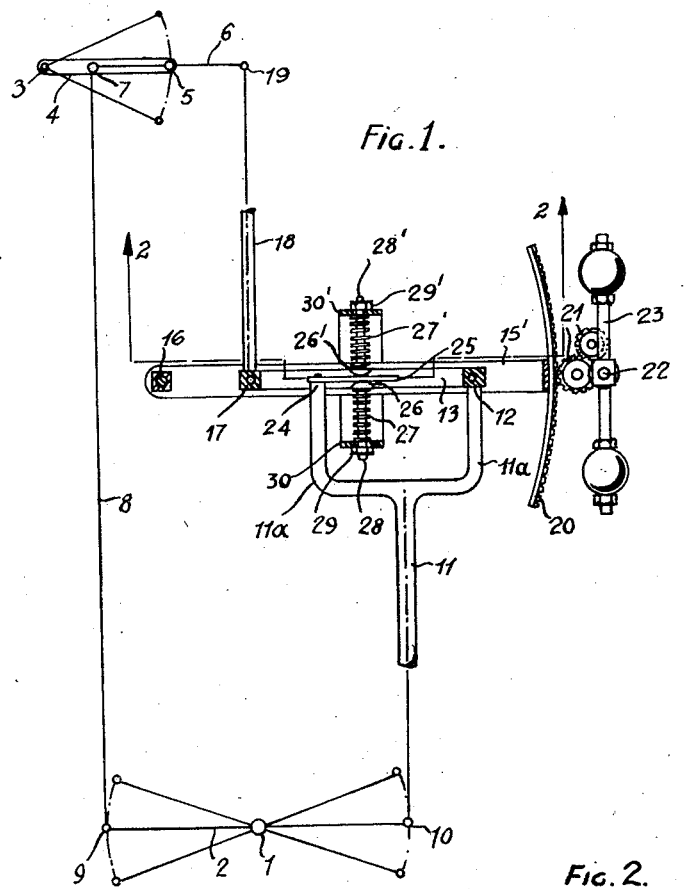
Fig. 1 shows an elevation, partly in section taken along the line 1—1 of Fig. 2, of an embodiment of the invention.
Figure 2:
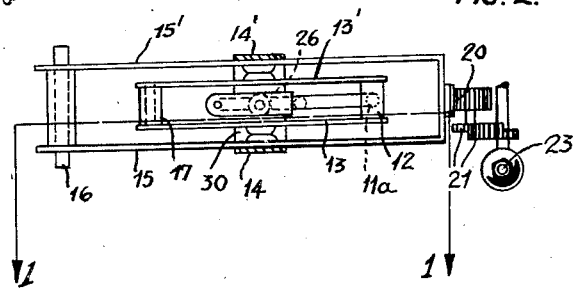
Fig. 2 is a fragmentary plan view, partly in section taken along the line 2—2 of Fig. 1, with certain parts omitted.

Referring to Fig. 1, on the shaft 1, for example of the servometer of a gyroscope (not shown in the drawing because it is not part of the present invention), is fixed an equilateral level 2. On the shaft 3 of the measuring or control apparatus (not shown since it is not part of the present invention) is mounted one end of a single-armed lever 4, to the other extremity 5 of which an equilateral rocking bar 6 is pivoted. To one end 7 of the rocking bar 6 is articulated a rod 8, which is articulated at its other end to the end 9 of the lever 2. At the other end 10 of the lever 2 is articulated one end of another rod 11 having at its other end a fork 11a. The end 12 of one limb of the fork 11a is articulated to one end of a duplex equilateral rocking bar 13, 13' which is pivoted at 14, 14' to the centre of a duplex single-armed lever 15, 15' pivoted at one end on a pivot pin 16 which is fixed in space. The other end 17 of the duplex rocking bar 13, 13' is linked by a connecting rod 18 to the end 19 of the rocking bar 6.

The duplex lever 15, 15', which encloses the duplex rocking bar 13, 13' is provided at its flying end (i. e., remote from its pivoted end) with a toothed segment 20 geared through a suitable multiplying gear train 21 to a shaft 22 journalled in bearings (not shown) which are fixed in space. This shaft is fitted with a fly 23 or a flywheel, or with both, according to requirements.

Fixed to the end 24 of the other limb of the fork 11a is a foot 25 engaged between two sprung buffers 26 and 26' which are loaded respectively by springs 27 and 27' encircling the buffer stems 28 and 28' which are threaded and fitted respectively with nuts 29 and 29' bearing against supporting brackets 30 and 30' fixed to the duplex lever 15, 15'. The position of the nuts 29 and 29', which limit the range of movement of the buffers 26 and 26', is adjusted so that the buffers just touch the foot 25.

The device operates as follows. When there is a relative motion of constant velocity between the gyroscope and its mounting, i. e., when the acceleration is zero, the servometer transmits motion of constant angular velocity to the shaft 1, for example in the anti-clockwise direction of the arrow shown in Fig. 4. The equilateral lever 2 fixed to the shaft 1 will rotate anti-clockwise as long as this motion continues, and the rocking bar 6 entrained by the rod 8 linking it to the lever 2, will move angularly in the same direction. If, at any given instant, the end 9 of the lever 2 be lowered a distance $x$ (Fig. 4) with reference to its neutral position shown in Fig. 3, the end 7 of the rocking bar 6 will be lowered the same distance $x$. The other end 19 of the lever 2, and with it the rod 11, is raised the same distance $x$, and the rod 11 will actuate the duplex lever 15, 15' through the foot 25, buffer 26', spring 27' and bracket 30'. Thereby as the motion is very slow, the duplex lever 15, 15' will have simultaneously executed the same anti-clockwise movement on its pivot 16, thereby imparting rotary motion to the governor 23 through the gears 20 and 21. The axis of the pivot 14, 14' will remain, during this motion, constantly on a level with the foot 25. The duplex rocking bar 13, 13' will consequently remain horizontal while moving bodily upwards through the distance $x$. Actuated by the rod 18 which links it to the end 17 of the duplex rocking bar 13, 13', the end 19 of the rocking bar 6 will accordingly be raised through the distance $x$. Now, since the other end 7 of the rocking bar 6 has been lowered the distance $x$, it follows that the centre of the rocking bar 6, i. e., its pivot 5, will have remained stationary in space. Therefore, the lever 4 will have remained stationary, thus indicating that no angular acceleration has taken place.

When there is relative motion of increasing velocity between the gyroscope and its mounting, i. e., when there is an angular acceleration, the servometer will impart a corresponding angular motion to the shaft 1, for example in the anticlockwise direction of the arrow shown in Fig. 5, the lever 2 will rotate in the anti-clockwise direction as long as this motion continues, and the rocking bar 6 will move angularly in the same direction. If, at any given instant, the end 9 of the lever 2 be lowered a distance $x$ (Fig. 5) with reference to its neutral position shown in Fig. 3, the end 7 of the rocking bar 6 will be lowered the same distance $x$. Moreover, the end 10 of the lever 2, and with it the rod 11, will be raised the same distance $x$ and the rod 11 will actuate the duplex lever 15, 15' through the foot 25, buffer 26', spring 27' and bracket 30'. However, in this case, in view of the acceleration of the motion, the duplex lever 15, 15' will not be able to follow this motion simultaneously, as was the case when there was no acceleration, because the governor 23 will have braked, i. e., retarded, the motion of the duplex lever 15, 15'. Consequently the foot 25 upwardly engaging the buffer 26' will compress the spring 27' which, by its tendency to recoil against the bracket 30', will progressively accelerate the motion of the lever 15, 15'. In the meantime, the end 12 of the duplex rocking bar 13, 13' will have been raised the distance $x$, but since the rising motion of the axis of the pivot 14, 14' connecting the rocking bar 13, 13' to the lever 15, 15' has been delayed, the end 17 of the bar 13, 13' will have risen only the distance $y$, $y$ being smaller than $x$. The end 19 of the rocking bar 6, actuated by the rod 18, will have done the same. Now, since the other end 7 of the bar 6 has been lowered the distance $x$, it follows that the centre of that bar, i. e., its pivot 5, has been lowered a distance $x-y$ thus causing the lever 4 to turn correspondingly in a clockwise direction on its shaft 3, the movement of which, being directly proportional to the detected acceleration, may be utilized for control purposes.

In proportion as the detected acceleration diminishes, the spring 27', in recoiling against the bracket 30', accelerates the motion of the duplex lever 15, 15' until such timt as there is no more delay, i. e. until the foot 25 returns to the level of the axis of the pivot 14, 14'. As long as the motion of the equilateral lever 2 continues at a constant speed, the same phenomena as those illustrated in Fig. 4 will be produced.

As soon as the motion of the equilateral lever 2 diminishes in speed, there will be deceleration; the system detects this in the same manner, in this case bringing the buffer 26, spring 27 and bracket 30 into action to impart an anti-clockwise motion to the lever 4.

In the case of an angular acceleration of the equilateral lever in the direction contrary to that indicated by the arrow in Fig. 5, i. e., in the clockwise direction, the functions of the springs 27' and 27 are reversed, the latter acting during the period of acceleration and the former during the period of deceleration.

By suitable choice of springs and of the mass of the fly (with or without a flywheel), any desired force can be brought to act on the shaft 3. In view of the fact that the device constitutes a direct mechanical transmission, the force exerted on the shaft 3 by the lever 4 must be supplied by the equilateral lever 2, i. e., by the shaft 1.

In certain cases, it will be advantageous to augment the action of the flywheel by a dashpot, or even to replace it by a double-action dashpot or two single-action dashpots.

Although the embodiment described refers more particularly to the detection of variations in oscillatory angular velocity, the device according to the invention can also be employed for the detection, measurement and utilization for purposes of control, of variations of simple angular velocities and also linear velocities.

According to the circumstances in any particular case, it will merely be necessary to connect the rods differently, which is within the powers of any expert skilled in the art and, for this reason, does not require any further explanation.

The invention is not limited to the described embodiment since this is merely an example and the invention is susceptible of various constructional modifications as has been indicated above.

I claim:

1. Device for directly measuring and utilizing for control purposes, variations in oscillatory angular velocities, comprising, in combination, a first member pivoted for oscillation in accordance with an oscillatory movement the acceleration or deceleration of which is to be measured, a second member pivoted to a first movable support, means forming a first mechanical drive connecting from said first member at a first point thereof at one side of its pivot to said second pivoted member at a first point thereof at one side of its pivot for causing movement of said point of said second member at all times in accordance with and directly proportional to the movement of said point of said first member, means forming a second mechanical drive from said first member at a second point at the opposite side of its pivot from its said first point to said second member at a second point at the opposite side of its pivot from its said first point, said last-mentioned means including a third member pivoted to a second movable support, resiliently yieldable buffer means carried by said second support, a rotary inertia device, means to drive said inertia device responsive to movement of said second support, means connecting said second point of said second member to a first point of said third member at one side of its pivot, means connecting said second point of said first member to a second point of said third member at the opposite side of its pivot from its said first point, and means connected to said second point of said first member and engaging said buffer means for moving said second support in response to movement of said first member in such a manner as to cause the pivot and said second point of said third member to be moved simultaneously and with the same displacement so that said third member is moved bodily parallel to its former position and transmits to said second member a displacement so related to that transmitted thereto directly and independently by said first mechanical drive means that the pivot of said second member and its said first support remain in a neutral position when and as long as said first member moves at a constant velocity, whereas movement of said second point of said third member and of said buffer-engaging means in response to an acceleration or deceleration of said first member causes said inertia device to become effective to delay follow-up movement of said second support responsive to the movement of said buffer-engaging means and causes said buffer means to yield and permit an overrun between said buffer-engaging means and said second support resulting in a difference in the displacement of the pivot and said second point of said third member so that said third member is turned about its pivot and transmits to said second member a displacement so related to that transmitted thereto directly and independently by said first mechanical drive means that the pivot of said second member and its said first support are displaced from said neutral position proportionally to the acceleration or deceleration of said first member whereby to indicate by their position at any instant the value of said acceleration or deceleration.

2. Device for directly measuring and utilizing for control purposes variations in oscillatory angular velocities, comprising, in combination, a first equilateral lever adapted to be impressed with an oscillatory movement the acceleration or deceleration of which is to be measured, a first single-armed lever pivoted at one end, a second equilateral lever pivoted to the other end of said first single-armed lever, a first connecting rod directly linking one end of said first equilateral lever to one end of said second equilateral lever, a second single-armed lever pivoted at one end, a driven time-delay device, means forming a driving connection between the other end of said second single-armed lever and said time-delay device, a third equilateral lever pivoted to an intermediate point of said second single-armed lever, a second connecting rod linking one end of said third equilateral lever to the other end of said first equilateral lever, a third connecting rod linking the other end of said third equilateral lever to the other end of said second equilateral lever, resilient buffers mounted on said second single-armed lever in opposed relation, said second connecting rod including a foot forming part thereof and disposed between said buffers for transmitting motion of said second connecting rod to said second single-armed lever, means for limiting the range of movement of each of said buffers such that at their limit of movement towards said foot said buffers respectively just touch the opposite sides of said foot, whereby to resolve the oscillatory movement of said first equilateral lever into two motions, one of which is transmitted directly to said one end of said second equilateral lever by said first connecting rod, and the other of which is transmitted to said other end of said second equilateral lever by said second connecting rod, said third equilateral lever and said third connecting rod acting serially and is displaced in time relatively to the first-mentioned motion, responsive to an acceleration or deceleration of said first equilateral lever, by co-action of said third equilateral lever with said second single-armed lever and its said buffers and said time-delay device in such a manner that the relative position of the centre pivot of said second equilateral lever indicates at any instant the value of said acceleration or deceleration, whereby said first single-armed lever is operatively responsive directly to said value.

3. Device as defined in claim 2, said time-delay device including masses rotatable about a driven axis, and means for adjusting the distances of said masses from said axis to vary the time-delay characteristic of said time-delay device.

LOUIS EUGÈNE WIDOLT
MONTROSE-OSTER.

REFERENCES CITED

The following references are of record in the file of this patent:

UNITED STATES PATENTS

| Number | Name | Date |
| --- | --- | --- |
| 2,381,225 | Newell | Aug. 7, 1945 |